(12) United States Patent
Padia et al.

(10) Patent No.: US 12,141,042 B2
(45) Date of Patent: Nov. 12, 2024

(54) VIRTUAL DISK GRAFTING AND DIFFERENTIAL BASED DATA PULLING FROM EXTERNAL REPOSITORY

(71) Applicant: Nutanix, Inc., San Jose, CA (US)

(72) Inventors: Praveen Kumar Padia, Fremont, CA (US); Deepak Narayan, Kerala (IN); Kamalneet Singh, Vancouver (CA); Monil Devang Shah, Milpitas, CA (US); Pradeep Kashyap Ramaswamy, Milpitas, CA (US); Prakash Narayanasamy, Saratoga, CA (US); Vinayak Hindurao Khot, Mountain View, CA (US); Vivek Venkatesan, Apex, NC (US)

(73) Assignee: Nutanix, Inc., San Jose, CA (US)

( * ) Notice: Subject to any disclaimer, the term of this patent is extended or adjusted under 35 U.S.C. 154(b) by 74 days.

(21) Appl. No.: 18/116,413

(22) Filed: Mar. 2, 2023

(65) Prior Publication Data

US 2024/0168854 A1 May 23, 2024

(30) Foreign Application Priority Data

Nov. 22, 2022 (IN) .............................. 202241066999

(51) Int. Cl.
*G06F 11/00* (2006.01)
*G06F 9/455* (2018.01)
(Continued)

(52) U.S. Cl.
CPC ...... *G06F 11/2046* (2013.01); *G06F 9/45558* (2013.01); *G06F 11/1662* (2013.01);
(Continued)

(58) Field of Classification Search
None
See application file for complete search history.

(56) References Cited

U.S. PATENT DOCUMENTS 8,037,345 B1 * 10/2011 Iyer ...................... G06F 16/183
714/766
8,549,518 B1 10/2013 Aron et al.
(Continued)

OTHER PUBLICATIONS

Google Scholar/Patents search—text refined (Year: 2024).*
(Continued)

*Primary Examiner* — Christopher S McCarthy
(74) *Attorney, Agent, or Firm* — Cesari and McKenna, LLP

(57) ABSTRACT

A technique utilizes grafting and differential based (diff-based) data seeding to hydrate a special virtual disk (vdisk) on a multi-node cluster with data changes (differences) between a reference vdisk stored on the cluster and a snapshot stored in an external repository to enable failover (including failback) recovery of an application workload in a disaster recovery environment. The application workload is stored as a workload vdisk on local storage of the cluster and snapshots of the workload vdisk are generated and organized as a vdisk chain on the cluster. One or more snapshots of the vdisk chain may be replicated to the external repository using a long-term snapshot service. Each replicated snapshot may be backed up from the cluster to the external repository at the granularity of a vdisk, referred to herein as an external datasource disk. The special vdisk is a thinly provisioned, datasource-backed vdisk that is grafted onto the vdisk chain, e.g., as a child vdisk of the reference vdisk. The differences between the reference vdisk and datasource disk are seeded from the datasource disk to hydrate the datasource-backed vdisk.

29 Claims, 7 Drawing Sheets

(51) Int. Cl.
*G06F 11/16* (2006.01)
*G06F 11/20* (2006.01)

(52) U.S. Cl.
CPC .............. *G06F 11/2023* (2013.01); *G06F 2009/45583* (2013.01); *G06F 2201/85* (2013.01)

(56) References Cited

U.S. PATENT DOCUMENTS

| | | |
|---|---|---|
| 8,601,473 B1 | 12/2013 | Aron et al. |
| 8,850,130 B1 | 9/2014 | Aron et al. |
| 8,863,124 B1 | 10/2014 | Aron et al. |
| 9,009,106 B1 | 4/2015 | Aron et al. |
| 9,069,708 B2 | 6/2015 | Gill et al. |
| 9,336,132 B1 | 5/2016 | Aron et al. |
| 9,524,389 B1 * | 12/2016 | Roth .................. G06F 9/45558 |
| 9,652,265 B1 | 5/2017 | Narayanasamy et al. |
| 9,747,287 B1 | 8/2017 | Bhardwaj et al. |
| 9,772,866 B1 | 9/2017 | Aron et al. |
| 11,436,097 B1 | 9/2022 | Kumar et al. |
| 11,586,391 B2 | 2/2023 | Tatiparthi et al. |
| 2012/0158659 A1 * | 6/2012 | Marathe .................. G06F 16/27 707/639 |
| 2015/0127618 A1 * | 5/2015 | Alberti .................. G06F 16/128 707/678 |
| 2022/0100371 A1 * | 3/2022 | Dillaman .............. G06F 3/0655 |
| 2022/0244856 A1 | 8/2022 | Kataria et al. |
| 2022/0253243 A1 | 8/2022 | Kataria et al. |
| 2022/0269571 A1 | 8/2022 | Mantri et al. |
| 2022/0358087 A1 | 11/2022 | Gupta et al. |
| 2022/0374316 A1 | 11/2022 | Kumar |
| 2022/0398163 A1 | 12/2022 | Bezbaruah et al. |
| 2023/0029677 A1 | 2/2023 | Gupta et al. |
| 2023/0315592 A1 * | 10/2023 | Su ....................... G06F 11/2048 714/4.11 |

OTHER PUBLICATIONS

Cano, Ignacio, "Curator: Self-Managing Storage for Enterprise Clusters" University of Washington; published Mar. 2017; pp. all.
Citrix XenDesktop 7.1 on Microsoft Hyper-V Server 2012 R2 on Nutanix Virtual Computing Platform Solution Design Citrix Validated Solutions, Jun. 25, 2014, 95 pages.
Poitras, Steven "The Nutanix Bible" from http://stevenpoitras.com/the-nutanix-bible/ Oct. 15, 2013 (Publication date based on indicated capture date by Archive.org first publication date unknown) pp. all.
Poitras, Steven "The Nutanix Bible—Classic Edition" from https://nutanixbible.com/, dated Feb. 28, 2023, 248 pages.

* cited by examiner

VIRTUAL DISK GRAFTING AND DIFFERENTIAL BASED DATA PULLING FROM EXTERNAL REPOSITORY

CROSS-REFERENCE TO RELATED APPLICATION

The present application claims the benefit of India Provisional Patent Application Serial No. 202241066999, which was filed on Nov. 22, 2022, by Praveen Kumar Padia, et al. for VIRTUAL DISK GRAFTING AND DIFFERENTIAL BASED DATA PULLING FROM EXTERNAL REPOSITORY, which is hereby incorporated by reference.

BACKGROUND

Technical Field

The present disclosure relates to data failover and, more specifically, to data failover using snapshots in a data replication environment.

Background Information

The amount of data stored, managed, and retrieved by commercial enterprises using distributed computing systems such as, e.g., on-premises and/or cloud datacenters, is constantly increasing, thus necessitating quick and efficient failover (including failback) and recovery of data in the event of a disaster. Data failover generally involves copying or replicating data among multiple datacenters to enable continued operation of data processing operations in a data replication environment, such as disaster recovery. As used herein, the data replication environment includes two or more datacenters, i.e., sites, which are often geographically separated by relatively large distances and connected over a communication network, e.g., a wide area network. For example, data at a local datacenter (primary site) may be replicated over the network to one or more remote datacenters located at geographically separated distances to ensure continued data processing operations in the event of a failure of the primary site.

Data may be replicated between the sites such that each update to the data at the primary site is copied to the remote site. However, copying of each data update typically requires constant transfer of data over networks spanning geographical areas in the data replication environment, which may be costly and expensive, as the network is often over-utilized with commensurate bandwidth reduction leading to needless replication that may fail to meet (satisfy) recovery point objective thresholds.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

Overview

Figure 1:
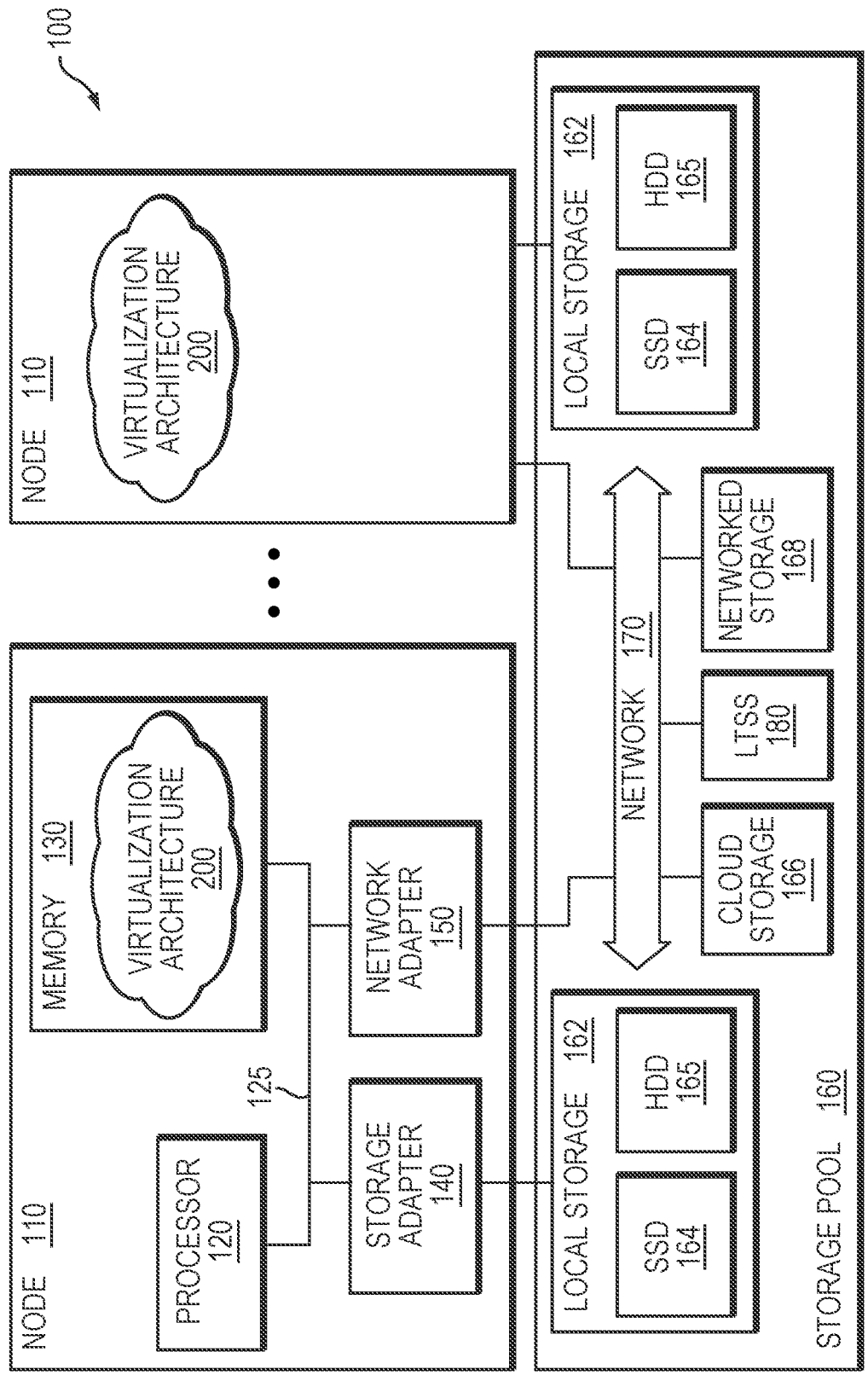
FIG. 1 is a block diagram of a plurality of nodes interconnected as a cluster in a virtualized environment.

The embodiments described herein are directed to a technique configured to utilize grafting onto an existing snapshot chain of a multi-node cluster and differential based (diff-based) data pulling (seeding) to efficiently hydrate a special virtual disk (vdisk). The special vdisk is grafted onto the snapshot chain with data changes (differences) between a reference vdisk stored on the cluster and a snapshot, each archived in an external repository so as to support rapid failover/failback recovery of an application workload in a disaster recovery (DR) environment. In this manner, the special vdisk provides for data changes retrieved on-demand from the external repository while providing unchanged data from ancestor snapshots previously stored on the cluster. Illustratively, the application workload (e.g., data) is stored as a workload vdisk on local storage of the cluster and snapshots of the workload vdisk are generated and organized as a snapshot (vdisk) chain on the cluster. One or more snapshots of the vdisk chain may be replicated (i.e., archived) to the external repository such as an object-store-based repository, e.g., Long-Term Snapshot Service (LTSS) by Nutanix. Each replicated snapshot may be backed up from the cluster to the external repository at the granularity of a vdisk, referred to herein as an external datasource disk. The special vdisk is a thinly provisioned, datasource-backed vdisk that is grafted onto the cluster vdisk snapshot chain, e.g., hidden as a child vdisk of the reference (parent) vdisk. The changed data between the reference vdisk and datasource disk are seeded (fetched) from the external datasource disk to hydrate the datasource-backed vdisk.

Since the workload vdisk is periodically snapshotted to the cluster and archived to an external repository via LTSS, data change information between snapshots may be obtained from the LTSS. A changed region tracking (CRT) application programming interface (API) provided by LTSS may be employed to identify the differences or "changed regions" between the datasource disk and reference vdisk indexed by the LTSS as archived in the external repository. The CRT API requests Changed Regions Information (CRI) by specifying source and reference disks, e.g., the datasource disk and the reference vdisk to optimally fetch only the changed regions to hydrate the datasource-backed vdisk on the cluster. Alternatively, the CRT API may operate without a reference disk to return CRI for only those regions of the datasource disk to which the data was actually written, i.e., including explicitly written zeros.

The grafting and diff-based data seeding technique described herein reduces the amount of data transfer and, thus, enables faster data seeding/transfer since only the changed data is fetched from the external repository. LTSS may utilize the CRI to identify (1) an underlying object (object name) of the object store (external repository, e.g., Amazon S3, Microsoft AZURE blob store, or the like) that stores each changed region for the datasource disk, (2) the offset within the object at which to access the changed data region of the datasource disk and (3) the length within the object of the changed data region. This CRI metadata is relayed (via metadata seeding) to a data I/O manager of the cluster, which transforms the CRI into mapping metadata structures for persistent storage in a metadata store of the cluster. Once metadata seeding is performed and the CRI is persistently stored on the metadata store, the technique reduces the use of LTSS because the changed regions needed to determine the data seeded from the external datasource disk can be retrieved from mapping structures in accordance with a "fast-path" feature of the technique to reduce use of, and hence load on, the LTSS. That is, the CRI metadata obtained from the LTSS guides retrieval of the data from the external repository (of the datasource disk) without further involvement from the LTSS.

Advantageously, the technique utilizes grafting and diff-based data seeding, as well as CRI metadata seeding in a cloud environment as a "DR as a Service" offering that obviates aggressive pulling of changed data yet still allows instant recovery (i.e., on-demand repository data retrieval) of an application workload. That is, the technique obviates initial fetching of data (up front) in order to power on and restore a user virtual machine (UVM) affected by the disaster, yet when requested by the UVM, read data may be pulled on-demand from the external repository or served from the snapshot chain onto which the datasource-backed vdisk is grafted using CRI metadata stored in the persistent metadata store. The external datasource disk is "hooked" to the datasource-backed vdisk to enable on-demand paging (backfilling) of data as required, i.e., to enable instant recovery of the UVM and its workload. The technique also incorporates CRI into persistent mapping structures to reduce use of the LTSS when retrieving changed data regions directly from external datasource vdisk via a fast-path feature.

DESCRIPTION

FIG. 1 is a block diagram of a plurality of nodes 110 interconnected as a cluster 100 and configured to provide compute and storage services for information, i.e., data and metadata, stored on storage devices of a virtualization environment. Each node 110 is illustratively embodied as a physical computer having hardware resources, such as one or more processors 120, main memory 130, one or more storage adapters 140, and one or more network adapters 150 coupled by an interconnect, such as a system bus 125. The storage adapter 140 may be configured to access information stored on storage devices, such as solid state drives (SSDs) 164 and magnetic hard disk drives (HDDs) 165, which are organized as local storage 162 and virtualized within multiple tiers of storage as a unified storage pool 160, referred to as scale-out converged storage (SOCS) accessible cluster-wide. To that end, the storage adapter 140 may include input/output (I/O) interface circuitry that couples to the storage devices over an I/O interconnect arrangement, such as a conventional peripheral component interconnect (PCI) or serial ATA (SATA) topology.

The network adapter 150 connects the node 110 to other nodes 110 of the cluster 100 over network 170, which is illustratively an Ethernet local area network (LAN). The network adapter 150 may thus be embodied as a network interface card having the mechanical, electrical and signaling circuitry needed to connect the node 110 to the network 170. The multiple tiers of SOCS include storage that is accessible through the network 170, such as cloud storage 166 and/or networked storage 168, as well as the local storage 162 within or directly attached to the node 110 and managed as part of the storage pool 160 of storage objects, such as files and/or logical units (LUNs). The cloud and/or networked storage may be embodied as network attached storage (NAS) or storage area network (SAN) and include combinations of storage devices (e.g., SSDs and/or HDDs) from the storage pool 160. A long-term snapshot storage (LTSS 180) service of an archival storage system provides storage of large numbers (amounts) of point-in-time images or recovery points (i.e., snapshots) of application workloads on an object store, which may be part of cloud storage 166. Communication over the network 170 may be effected by exchanging discrete frames or packets of data according to protocols, such as the Transmission Control Protocol/Internet Protocol (TCP/IP) and the OpenID Connect (OIDC) protocol, although other protocols, such as the User Datagram Protocol (UDP) and the HyperText Transfer Protocol Secure (HTTPS), as well as specialized application program interfaces (APIs) may also be advantageously employed.

The main memory 130 includes a plurality of memory locations addressable by the processor 120 and/or adapters for storing software code (e.g., processes and/or services) and data structures associated with the embodiments described herein. The processor and adapters may, in turn, include processing elements and/or circuitry configured to execute the software code, such as virtualization software of virtualization architecture 200, and manipulate the data structures. As described herein, the virtualization architecture 200 enables each node 110 to execute (run) one or more virtual machines that write data to the unified storage pool 160 as if they were writing to a SAN. The virtualization environment provided by the virtualization architecture 200 relocates data closer to the virtual machines consuming the data by storing the data locally on the local storage 162 of the cluster 100 (if desired), resulting in higher performance at a lower cost. The virtualization environment can horizontally scale from a few nodes 110 to a large number of nodes, enabling organizations to scale their infrastructure as their needs grow.

It will be apparent to those skilled in the art that other types of processing elements and memory, including various computer-readable media, may be used to store and execute program instructions pertaining to the embodiments described herein. Also, while the embodiments herein are described in terms of software code, processes, and computer (e.g., application) programs stored in memory, alternative embodiments also include the code, processes and programs being embodied as logic, components, and/or modules consisting of hardware, software, firmware, or combinations thereof.

Figure 2:
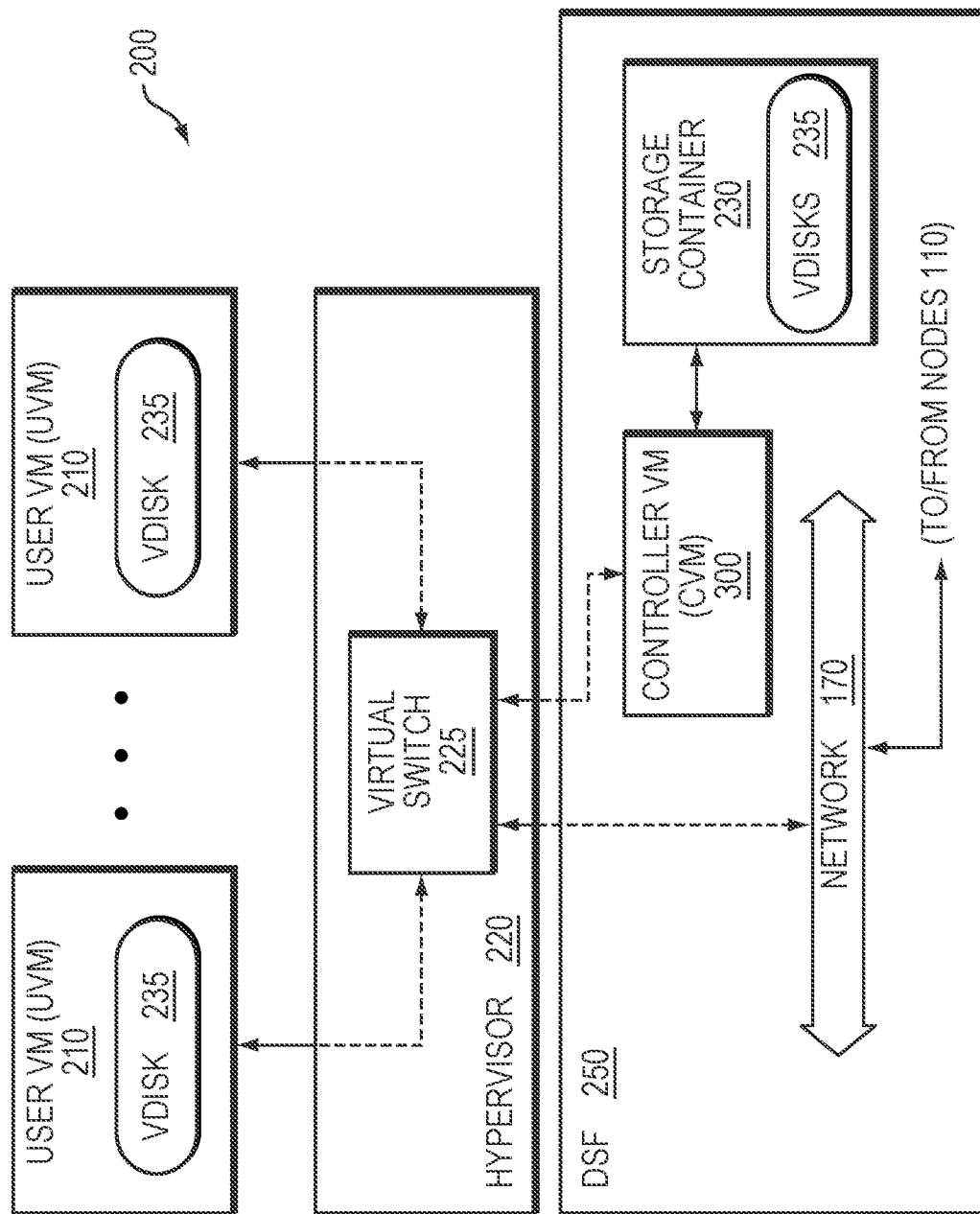
FIG. 2 is a block diagram of a virtualization architecture executing on a node to implement the virtualization environment.

FIG. 2 is a block diagram of a virtualization architecture 200 executing on a node to implement the virtualization environment. Each node 110 of the cluster 100 includes software components that interact and cooperate with the hardware resources to implement virtualization. The software components include a hypervisor 220, which is a virtualization platform configured to mask low-level hardware operations from one or more guest operating systems executing in one or more user virtual machines (UVMs) 210 that run client software. The hypervisor 220 allocates the hardware resources dynamically and transparently to manage interactions between the underlying hardware and the UVMs 210. In an embodiment, the hypervisor 220 is illustratively the Nutanix Acropolis Hypervisor (AHV), although other types of hypervisors, such as the Xen hypervisor, Microsoft's Hyper-V, RedHat's KVM, and/or VMware's ESXi, may be used in accordance with the embodiments described herein.

Another software component running on each node 110 is a special virtual machine, called a controller virtual machine (CVM) 300, which functions as a virtual controller for SOCS. The CVMs 300 on the nodes 110 of the cluster 100 interact and cooperate to form a distributed system that manages all storage resources in the cluster. Illustratively, the CVMs and storage resources that they manage provide an abstraction of a distributed storage fabric (DSF) 250 that scales with the number of nodes 110 in the cluster 100 to provide cluster-wide distributed storage of data and access to the storage resources with data redundancy across the cluster. That is, unlike traditional NAS/SAN solutions that are limited to a small number of fixed controllers, the virtualization architecture 200 continues to scale as more nodes are added with data distributed across the storage resources of the cluster. As such, the cluster operates as a hyperconvergence architecture wherein the nodes provide both storage and computational resources available cluster-wide.

The client software (e.g., applications) running in the UVMs 210 may access the DSF 250 using filesystem protocols, such as the network file system (NFS) protocol, the common internet file system (CIFS) protocol and the internet small computer system interface (iSCSI) protocol. Operations on these filesystem protocols are interposed at the hypervisor 220 and redirected (via virtual switch 225) to the CVM 300, which exports one or more iSCSI, CIFS, or NFS targets organized from the storage objects in the storage pool 160 of DSF 250 to appear as disks to the UVMs 210. These targets are virtualized, e.g., by software running on the CVMs, and exported as virtual disks (vdisks) 235 to the UVMs 210. In some embodiments, the vdisk is exposed via iSCSI, CIFS or NFS and is mounted as a virtual disk on the UVM 210. User data (including the guest operating systems) in the UVMs 210 reside on the vdisks 235 and operations on the vdisks are mapped to physical storage devices (SSDs and/or HDDs) located in DSF 250 of the cluster 100.

In an embodiment, the virtual switch 225 may be employed to enable I/O accesses from a UVM 210 to a storage device via a CVM 30) on the same or different node 110. The UVM 210 may issue the I/O accesses as a SCSI protocol request to the storage device. Illustratively, the hypervisor 220 intercepts the SCSI request and converts it to an iSCSI, CIFS, or NFS request as part of its hardware emulation layer. As previously noted, a virtual SCSI disk attached to the UVM 210 may be embodied as either an iSCSI LUN or a file served by an NFS or CIFS server. An iSCSI initiator, SMB/CIFS or NFS client software may be employed to convert the SCSI-formatted UVM request into an appropriate iSCSI, CIFS or NFS formatted request that can be processed by the CVM 300. As used herein, the terms iSCSI, CIFS and NFS may be interchangeably used to refer to an IP-based storage protocol used to communicate between the hypervisor 220 and the CVM 300. This approach obviates the need to individually reconfigure the software executing in the UVMs to directly operate with the IP-based storage protocol as the IP-based storage is transparently provided to the UVM.

For example, the IP-based storage protocol request may designate an IP address of a CVM 300 from which the UVM 210 desires I/O services. The IP-based storage protocol request may be sent from the UVM 210 to the virtual switch 225 within the hypervisor 220 configured to forward the request to a destination for servicing the request. If the request is intended to be processed by the CVM 300 within the same node as the UVM 210, then the IP-based storage protocol request is internally forwarded within the node to the CVM. The CVM 300 is configured and structured to properly interpret and process that request. Notably, the IP-based storage protocol request packets may remain in the node 110 when the communication—the request and the response-begins and ends within the hypervisor 220. In other embodiments, the IP-based storage protocol request may be routed by the virtual switch 225 to a CVM 300 on another node of the cluster 100 for processing. Specifically, the IP-based storage protocol request is forwarded by the virtual switch 225 to a physical switch (not shown) for transmission over network 170 to the other node. The virtual switch 225 within the hypervisor 220 on the other node then forwards the request to the CVM 300 on that node for further processing.

Figure 3:
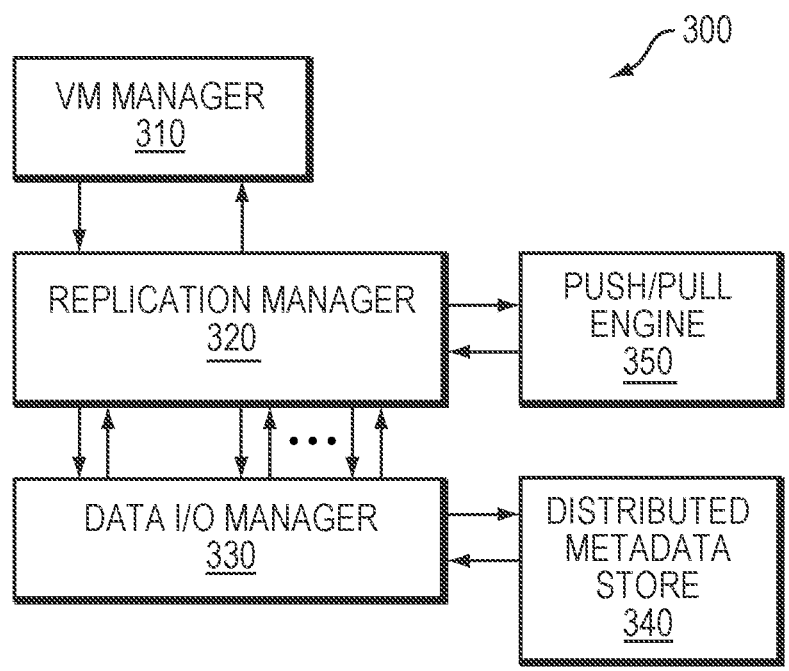
FIG. 3 is a block diagram of a controller virtual machine of the virtualization architecture.

FIG. 3 is a block diagram of the controller virtual machine (CVM) 300 of the virtualization architecture 200. In one or more embodiments, the CVM 300 runs an operating system (e.g., the Acropolis operating system) that is a variant of the Linux® operating system, although other operating systems may also be used in accordance with the embodiments described herein. The CVM 300 functions as a distributed storage controller to manage storage and I/O activities within DSF 250 of the cluster 100. Illustratively, the CVM 300 runs as a virtual machine above the hypervisor 220 on each node and cooperates with other CVMs in the cluster to form the distributed system that manages the storage resources of the cluster, including the local storage 162, the networked storage 168, and the cloud storage 166. Since the CVMs rin as virtual machines above the hypervisors and, thus, can be used in conjunction with any hypervisor from any virtualization vendor, the virtualization architecture 200 can be used and implemented within any virtual machine architecture, allowing the CVM to be hypervisor agnostic. The CVM 300 may therefore be used in a variety of different operating environments due to the broad interoperability of the industry standard IP-based storage protocols (e.g., iSCSI, CIFS, and NFS) supported by the CVM.

Illustratively, the CVM 300 includes a plurality of processes embodied as services of a storage stack running in a user space of the operating system of the CVM to provide storage and I/O management services within DSF 250. The processes include a virtual machine (VM) manager 310 configured to manage creation, deletion, addition and removal of virtual machines (such as UVMs 210) on a node 110 of the cluster 100. For example, if a UVM fails or crashes, the VM manager 310 may spawn another UVM 210 on the node. A replication manager 320 is configured to provide replication and disaster recovery capabilities of DSF 250. Such capabilities include migration/failover or failback of virtual machines and containers, as well as scheduling of snapshots. The replication manager 320*a* may interact with a push/pull engine 350 that includes logic configured to drive data and metadata seeding as described herein. In an embodiment, the push/pull engine 350 may be a service included as part of the replication manager 320 executing in the CVM 300. A data I/O manager 330 is responsible for all data management and I/O operations in DSF 250 and provides a main interface to/from the hypervisor 220, e.g., via the IP-based storage protocols. Illustratively, the data I/O manager 330 presents a vdisk 235 to the UVM 210 in order to service I/O access requests by the UVM to the DFS. A distributed metadata store 340 stores and manages all metadata in the node/cluster, including metadata structures that store metadata used to locate (map) the actual content of vdisks on the storage devices of the cluster.

Figure 4:
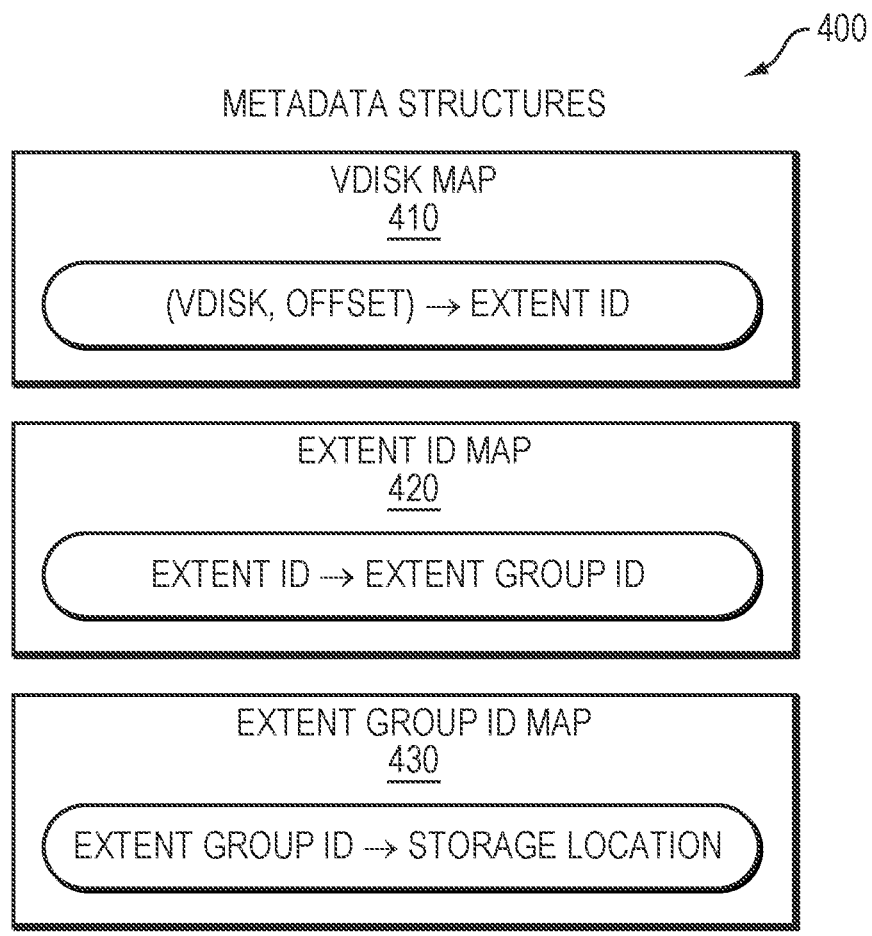
FIG. 4 is a block diagram of metadata structures used to map virtual disks (vdisks) of the virtualization architecture.

FIG. 4 is a block diagram of metadata structures 400 used to map virtual disks of the virtualization architecture. Each vdisk 235 corresponds to a virtual address space for storage exposed as a disk to the UVMs 210. Illustratively, the address space is divided into equal sized units called virtual blocks (vblocks). A vblock is a chunk of pre-determined storage, e.g., 1 MB, corresponding to a virtual address space of the vdisk that is used as the basis of metadata block map structures described herein. The data in each vblock is physically stored on a storage device in units called extents. Extents may be written/read/modified on a sub-extent basis (called a slice) for granularity and efficiency. A plurality of extents may be grouped together in a unit called an extent group. Each extent and extent group may be assigned a unique identifier (ID), referred to as an extent ID and extent group ID, respectively. An extent group is a unit of physical allocation that is stored as a file on the storage devices.

Illustratively, a first metadata structure embodied as a vdisk map 410 is used to logically map the vdisk address space for stored extents. Given a specified vdisk and offset, the logical vdisk map 410 may be used to identify a corresponding extent (represented by extent ID). A second metadata structure embodied as an extent ID map 420 is used to logically map an extent to an extent group. Given a specified extent ID, the logical extent ID map 420 may be used to identify a corresponding extent group containing the extent. A third metadata structure embodied as an extent group ID map 430 is used to map a specific physical storage location for the extent group. Given a specified extent group ID, the physical extent group ID map 430 may be used to identify information corresponding to the physical location of the extent group on the storage devices such as, for example, (1) an identifier of a storage device that stores the extent group. (2) a list of extent IDs corresponding to extents in that extent group, and (3) information about the extents, such as reference counts, checksums, and offset locations.

In an embodiment. CVM 300, DSF 250 and LTSS 180 may cooperate to provide support for snapshots, which are point-in-time copies of storage objects, such as files. LUNs and/or vdisks. For example, CVM 300, DSF 250 and LTSS 180 may cooperate to process an application workload (e.g., data) for local storage on a vdisk 235 of the cluster 100 (on-premises) as one or more generated snapshots that may be further processed for replication to an external repository. The replicated snapshot data may be backed up from the cluster 100 to the external repository at the granularity of a vdisk. The external 1o repository may be a backup vendor or, illustratively, cloud-based storage 166, such an object store. The vdisks that are backed up in these external repositories are referred to herein as external datasource disks.

In the event of a disaster, the application workload processed by a UVM of the primary site cluster 100 may fail over to the secondary site (e.g., a cloud cluster platform) and one or more instances of the cluster 100 with similar capabilities may be provisioned for recovery of the workload on the cloud platform. Data failover or failback generally involves copying or replicating data among one or more nodes 110 of clusters 100 embodied as, e.g., datacenters to enable continued operation of data processing operations in a data replication environment, such as backup or disaster recovery. The data replication environment includes two or more datacenters, i.e., sites, some of which may be cloud sites such those operated by third-party service providers (e.g., Amazon Web Services, Microsoft Azure). These sites are typically geographically separated by relatively large distances and connected over a communication network, such as a WAN. For example, data at a local datacenter (primary site) may be replicated over the network to one or more remote datacenters, acting as repository sites (e.g., LTSS running on AWS or Azure) used for data recovery, located at geographically separated distances to ensure continuity of data processing operations in the event of a failure of the nodes at the primary site. In addition, one or more secondary sites may act as application recovery sites once data has been recovered from a repository site.

Illustratively, asynchronous (incremental) replication is employed between the sites using, for example, a point-in-time image replication from the primary site to the secondary site which is not more than 60 minutes behind. Incremental replication generally involves at most two point-in-time images or snapshots of the data to be replicated, e.g., a base snapshot that is used as a reference and a current snapshot that is used to identify incremental changes to the data since the base snapshot. To facilitate efficient incremental replication in a data protection environment, a base snapshot is desired at each site; alternatively, data can be pulled/seeded from explicitly written data to the disk itself. Note that the data may include an entire state of a virtual machine including associated storage objects. Once the provisioning is complete, the failover/failback data may be brought online on the remote site cluster using LTSS 180, which may be running on the cloud.

The embodiments described herein are directed to a technique configured to utilize grafting and differential based (diff-based) data pulling (seeding) to efficiently hydrate a special virtual disk (vdisk) grafted onto an existing snapshot chain of a multi-node cluster with data changes (differences) between a reference vdisk stored on the cluster and a snapshot, each stored (i.e., archived) in an external repository to support rapid failover/failback recovery of an application workload in a disaster recovery (DR) environment. In this manner, the special vdisk provides data changes retrieved on-demand from the external repository while providing unchanged data from ancestor snapshots previously stored on the cluster. Illustratively, the application workload (e.g., data) is stored as a workload vdisk on local storage of the cluster and snapshots of the workload vdisk are generated and organized as a snapshot (vdisk) chain on the cluster. One or more snapshots of the vdisk chain may be replicated (archived) to the external repository using LTSS. Each replicated snapshot may be backed up from the cluster to the external repository at the granularity of a vdisk, referred to herein as an external datasource disk.

Illustratively, during a failover/failback event, the special vdisk is created as a thinly provisioned, datasource-backed vdisk that is grafted onto the cluster vdisk snapshot chain, e.g., hidden as a child vdisk of the reference (parent) vdisk. The differences between the reference vdisk and datasource disk are seeded (fetched) from the external datasource disk to hydrate the datasource-backed vdisk. In this manner, the special vdisk accumulates the differences as data changes from the reference snapshot already stored on the cluster with read requests to the special vdisk steering the hydration on-demand. Note that the special vdisk itself also acts as a backing store for a clone vdisk provided as failover storage for the failover/failback recovery of the application workload.

The technique described herein may apply to at least two data replication environments each using retrieval of data from external sources for recovery. The first 1o environment is a DR environment where the CVM 300 cooperates with LTSS 180 to push data from a cluster to cloud storage (external repository) and, when necessary, pull data from the repository to the cluster. This DR environment enables seamless movement of data between an on-premises cluster (e.g., a primary site) and a cluster that is spun up in the cloud (e.g., a secondary site). The second environment is a data replication environment involving backup where data is periodically snapshotted and replicated to the external repository (object store) via LTSS and diff-based data seeding is employed to fetch data back from the object store via LTSS in response to recovery from, e.g., a data corruption by a rogue application or a ransomware attack.

Figure 5:
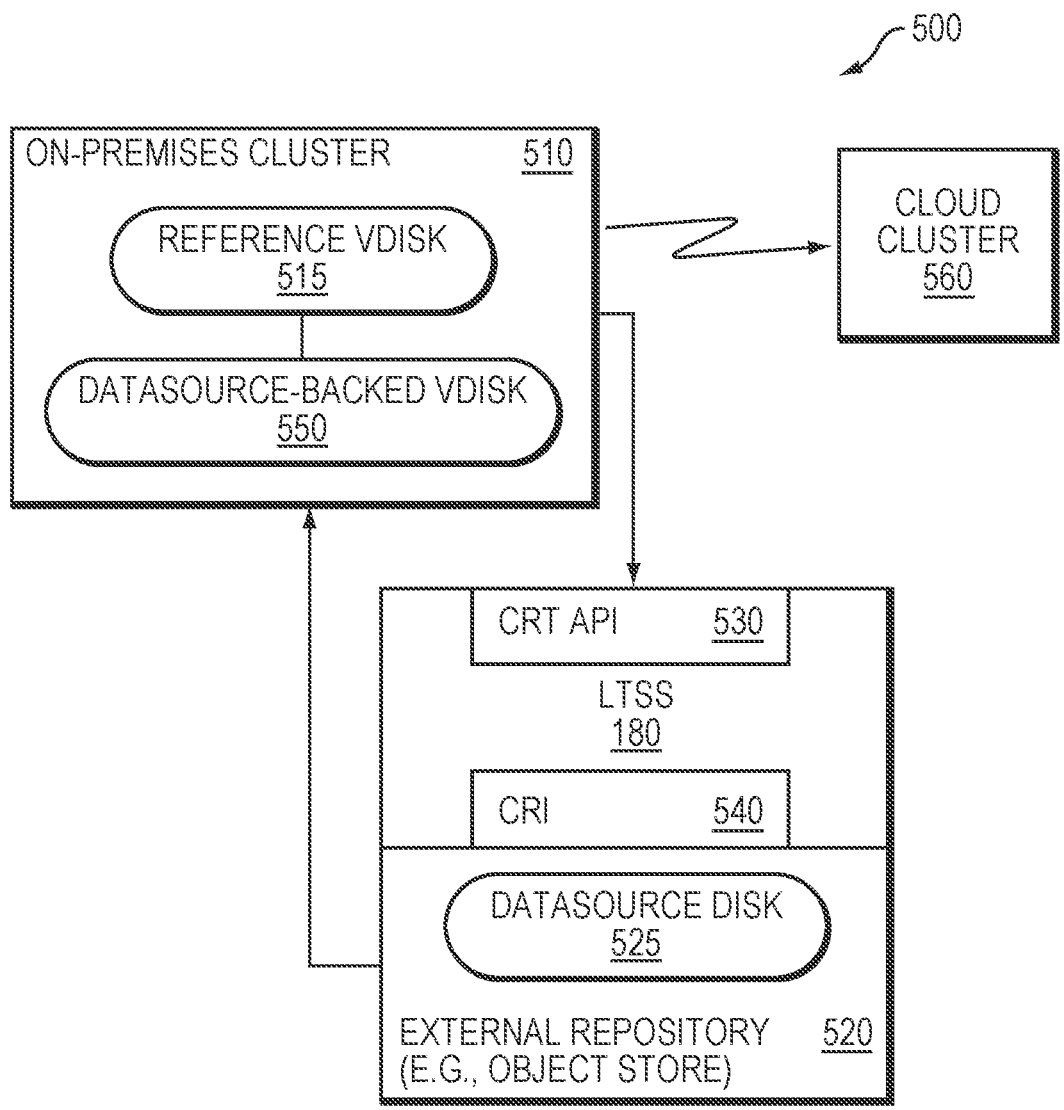
FIG. 5 is a block diagram of an exemplary data replication environment.

FIG. 5 is a block diagram of an exemplary data replication environment configured for use in various deployments, such as for backup and/or disaster recovery (DR). Illustratively, the environment 500 includes an on-premises cluster 510 (e.g., primary site A) and/or a cloud cluster 560 (secondary site B), as well as LTSS 180. Each site represents a datacenter embodied as cluster 100 having one or more nodes 110. A category of data (e.g., one or more UVMs 210 and its associated application workload) running on a node 110 at primary site A is designated for failover (failover data) recovery to a secondary site B (e.g., secondary node 110) in the event of failure of primary site A for a DR environment or for failover recovery from an external repository 520 in the event of a data corruption at primary site A for a backup environment. Although the technique may be applied to the DR environment, the following description is illustratively directed to an exemplary backup environment.

In an embodiment, to facilitate the failover/failback recovery, LTSS 180 may process a request to determine changes between an incremental snapshot of the failover/failback data generated on the on-premises cluster 510 and a parent snapshot (reference vdisk 515) of an external child snapshot (i.e., datasource disk 525) that is stored on an external repository 520 (object store) of, e.g., cloud storage 166, and indexed by the LTSS. During failover/failback recovery, only the differences (i.e., determined changes) between the reference vdisk 515 and datasource disk 525 are pulled (fetched) in accordance with diff-based data seeding of a recovery vdisk. Specifically, a Changed Region Tracking (CRT) application programming interface (API) provided by LTSS 180 may be employed to identify the differences or "changed regions" between the datasource disk 525 and reference vdisk 515 indexed by the LTSS. The CRT API 530 requests changed regions information (CRI 540) by specifying the datasource disk 525 and the reference vdisk 515 to optimally fetch only the changed regions to hydrate the datasource-backed vdisk 550 on the cluster. The CRT API 530 may also provide CRI 540 by specifying the datasource disk without a reference, in which case CRI 540 will be returned for only those regions on the datasource disk 525 that were actually written, i.e., including explicitly written zeros.

Specifically, the CRT API 530 (e.g., GetChangedRegions) provides metadata for the region that differs between the vdisks. For a baseline data transfer (i.e., without a reference), the CRT API 530 can also provide information about zero/unmapped regions, which avoids calls to the external repository 520 to transfer data region contents having zeros so that only on-disk locations that have been written (modified) are fetched. Using the CRT API 530, data may be efficiently seeded from the external datasource disk 525 as mapped ranges. According to the technique, the datasource-backed vdisk 550 is created on the cluster 510 and configured as a local, thinly provisioned vdisk associated with the reference vdisk 515 to receive the changed data fetched (hydrated) from the external datasource disk 525. The thinly provisioned vdisk backs a clone vdisk acting as the recovery vdisk at the secondary site so that failover/failback of the application workload may occur nearly instantly with hydration of the thinly provisioned vdisk steered on-demand by the application workload. In this manner, hydrating of the data changes from the datasource disk 525 to the datasource-backed vdisk 550 enables powering on of a virtual machine, such as UVM 210, without data being available locally in the cluster 510.

In an embodiment, diff-based seeding of data may be performed with or without an on-premises reference vdisk 515. For diff-based data seeding without a reference (i.e., baseline data transfer), only the written data contents are fetched from the datasource disk 525. The CRT API 530 provided by LTSS 180 identifies only those regions of the datasource disk 525 that were written or changed from the reference vdisk 515, thereby eliminating fetching of data from regions that were not changed, i.e., regions of the datasource disk 525 having unmodified data. That is, the LTSS provides only the latest version of data after fetching the reference vdisk. When fetching data from the external repository 520 using LTSS 180, as with any data extraction model, there are certain aspects of a data retrieval mechanism that need consideration: (i) the protocol or API framework for retrieval of snapshot configuration, metadata and data; (ii) the retrieval mechanism to consume the retrieved information and rebuilding state; and (iii) a facility to prepare and export the data for consumption instantly or otherwise.

Figure 6:
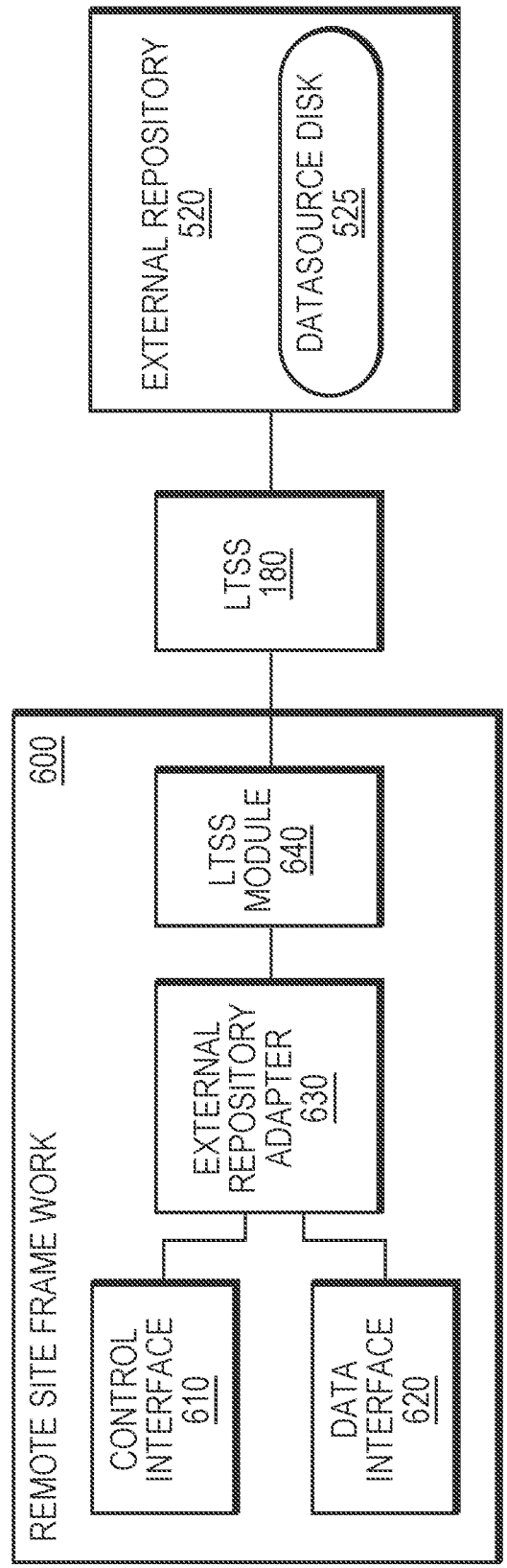
FIG. 6 is a block diagram of a remote site framework.

To that end, communication between the data I/O manager 330 and LTSS 180 may be implemented by a cluster remote site framework. FIG. 6 is a block diagram of a remote site framework 600 that may be advantageously used with the embodiments described herein. The data I/O manager 330 utilizes the remote site framework 600 to create a control interface 610 and a data interface 620 for transacting with LTSS and datasource disk 525 stored on the external repository via LTSS. In this manner, the remote site framework abstracts data input/output (I/O) to the external repository for the data I/O manager. Illustratively, the remote site framework 600 provides an external repository adapter 630 and LTSS module 640 to communicate with the LTSS 180 to transact with the repository 520 and may be used by push/pull engine 350 of CVM 300.

Figure 7A:
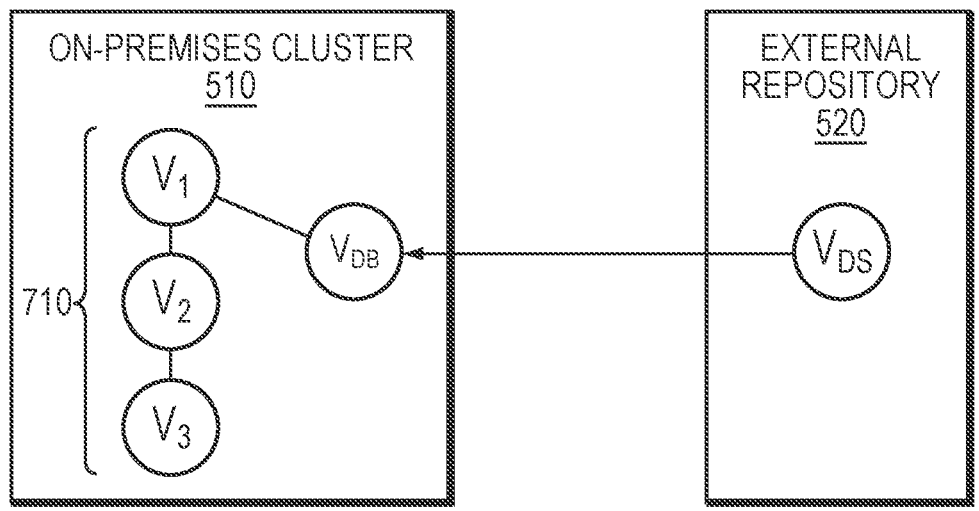
FIGS. 7A-7C illustrate a grafting and differential based data pulling technique according to one or more exemplary embodiments described herein.

FIG. 7A illustrates a grafting and differential based (diff-based) data pulling technique according to one or more exemplary embodiments described herein. Illustratively, snapshots of a workload may be generated and maintained on-premises (at the cluster 510); however, maintaining a large number of snapshots on-premises may be expensive. Accordingly, a snapshot policy or schedule may be implemented that generates and maintains only periodic (e.g., weekly) snapshots at the on-premises cluster 510 as a vdisk hierarchy or "chain" with the intervening snapshots stored by LTSS 180 on the external repository 520. A vdisk snapshot chain 710 may be embodied as weekly snapshots $V_1$-$V_3$. Assume a correction to the workload arises somewhere between two successive weekly snapshots $V_1$ and $V_2$. The data needed for the correction is stored on an intervening snapshot $V_{DS}$ (a datasource vdisk) at the external repository 520 and either on-premises snapshot $V_1$ or $V_2$ may be selected as a reference vdisk. The data may be fetched from the datasource vdisk $V_{DS}$ and stored on the datasource-backed vdisk $V_{DB}$ (i.e., thinly provisioned special vdisk), which is grafted onto the vdisk chain 710 at the selected reference vdisk position (e.g., $V_1$) of the weekly vdisk chain 710 as a child vdisk of the reference vdisk $V_1$. Note that the $V_{DB}$ may be hidden as it acts as a staging mechanism to accumulate data changes from the reference snapshot and also acts as a reference for a clone vdisk provided as failover storage for the failover/failback recovery of the application workload. Accordingly, the technique fetches the differences/changes in content between $V_1$ and $V_{DS}$ for diff-based seeding of data.

Figure 7B:
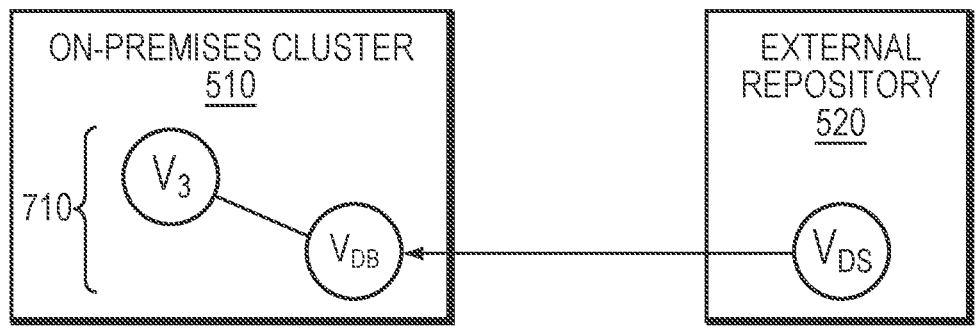

FIG. 7B illustrates the grafting and diff-based data pulling technique according to one or more exemplary embodiments described herein. In an embodiment, vdisk chain 710 has a single snapshot $V_3$ at the on-premises cluster 510. Datasource vdisk $V_{DS}$ is stored in the external repository 520 and datasource-backed vdisk $V_{DB}$ is configured as child (or leaf) of the parent snapshot $V_3$. For both on-premises snapshot configurations of FIGS. 7A and 7B, the data fetched (pulled) is based on a differencing algorithm that determines which snapshot/vdisk in the vdisk chain 710 is closest (i.e., has a least number of data changes or amount/size of data changed) to the external datasource disk $V_{DS}$ to be recovered.

Figure 7C:
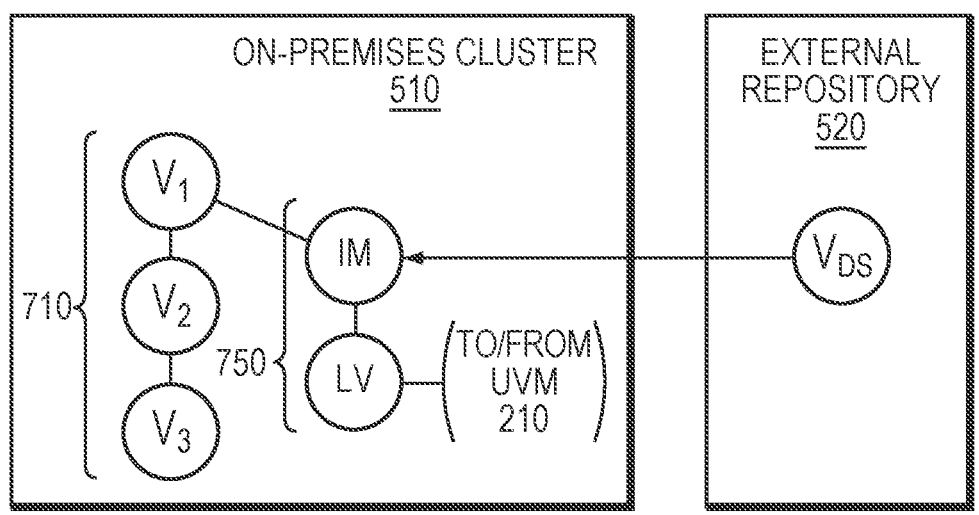

FIG. 7C illustrates the grafting and diff-based data pulling technique according to one or more exemplary embodiments described herein (including, e.g., the embodiments of FIGS. 7A and 7B). In an embodiment, a vdisk chain 700 includes a forked vdisk chain 750. Datasource-backed vdisk $V_{DB}$ is created as a clone and a snapshot of $V_{DB}$ is generated. Note that a snapshot is an immutable (read-only) point-in-time copy/image of a vdisk, whereas a clone is a mutable (read/write) point-in-time copy/image of the vdisk. The snapshot $V_{DB}$ is converted to an immutable (IM) vdisk that is configured to receive changed data regions hydrated from datasource-backed vdisk $V_{DB}$ of the external repository 520 (i.e., accumulates the changes between the $V_{DS}$ and the $V_1$ snapshot). To support immediate application data recording, the vdisk $V_{DB}$ is a mutable live (LV) vdisk backed by the IM vdisk and attached to both the forked vdisk chain 750 and UVM 210. As a result, UVM 210 can write data to the LV vdisk. Note that to facilitate transparent recovery, the IM snapshot (i.e., the thinly provisioned special vdisk) is hidden in the snapshot chain so that the clone (LV) appears as the direct child of $V_1$.

In an embodiment, the push/pull engine 350 of CVM 300 configures (sets up) a vdisk chain (hierarchy) 710 for grafting. According to the technique, reference identification is performed by the replication manager 320 and involves determining the reference vdisk $V_1$ or $V_3$ (hereinafter 515) within the vdisk chain 710 at which to graft/insert the datasource-backed vdisk $V_{DB}$ (hereinafter 550) based on a "closest" vdisk result from the differencing algorithm. Once the reference vdisk 515 is identified, the push/pull engine 350 may be invoked to "fork" (branch off) from that reference vdisk in the vdisk chain 710 and create a child (the datasource-backed vdisk 550) associated with the reference vdisk 515. Thereafter, the push/pull engine 350 interacts and cooperates with the data I/O manager 330 to configure the forked vdisk chain 750 and hydrate the datasource-backed vdisk 550.

For LTSS integration without a datasource reference (i.e., a vdisk hierarchy provisioned for baseline data transfer), the push/pull engine 350 creates a two-level vdisk hierarchy. A parent vdisk (e.g., datasource-backed vdisk 550) is configured with backing configuration that points to a provided disk recovery point (e.g., a backing configuration that points to a provided disk on LTSS) and a mutable child vdisk (e.g., the LV vdisk) is configured with a location identifier of the disk recovery point. The datasource-backed vdisk 550 is managed by the push/pull engine 350 and the LV vdisk 550 is attached to a (e.g., NFS) disk path provided by the vdisk. The datasource-backed vdisk 550 is also configured with the backing configuration which includes the datasource information. As used herein, grafting involves attaching an externally backed vdisk, i.e., the datasource-backed vdisk 550, onto an existing vdisk chain 710. More specifically, grafting involves (i) identifying a suitable reference vdisk 515 between the external repository 520 and the on-premises cluster 510; and (ii) attaching the datasource-backed vdisk 550 onto the vdisk chain 710 of the on-premises reference vdisk 515. Grafting thus enables the datasource-backed vdisk 550 to share data available on the on-premises cluster 510 in an existing vdisk chain 710. The parent of the datasource-backed vdisk 550 is the reference vdisk 515. Since the technique grafts a datasource-backed vdisk 550 onto an existing vdisk chain 710, most of the data that the datasource-backed vdisk 550 needs from the datasource disk 525 of the external repository 520 may be resident in an ancestor (e.g., the parent) of the grafted datasource-backed vdisk 550. Hence the technique efficiently fetches (pulls in) only the data that is different between the datasource disk 525 and the parent reference vdisk 515.

In an embodiment, grafting optimizes data transfers from the external repository 520 by fetching the changed block/range (metadata seeding) as a precursor to a subsequent initiating of background/foreground data seeding for the datasource-backed disk 550 from the external repository 520. In this manner, metadata indicates where and what data to retrieve, which maintains efficiency of hydration. Similarly, the optimized grafting accommodates where the reference vdisk 515 is available locally and the datasource-backed disk 550 is established as a child of the reference vdisk, thus enabling grafting to pull in only the differential data (identified by the metadata) between the reference vdisk 515 and the datasource disk 525.

Illustratively, the push/pull engine 350 drives the background data seeding procedure to obtain data ranges referencing data to retrieve by invoking data range-type remote procedure calls (RPCs) to the data I/O manager 330. These RPCs contain the ranges of CRI data that are to be seeded from the external datasource disk 525. According to the technique, data I/O manager 330 employs the CRI 540 to efficiently seed, e.g., (sequentially), only the changed data regions of the datasource disk 525. Notably, with LTSS 180 support of CRI 540, the push/pull engine 350 may be configured to also drive the seeding of CRI metadata through use of a metadata range-type RPC. Before issuing RPCs to seed the data, the push/pull engine 350 first issues an RPC call to the data I/O manager 330 to cache the CRI (e.g., in memory 130) that is needed before data seeding. Note that caching is an intermediate step in persistently storing the seeded metadata in vdisk map 410, extent ID map 420 and extent group ID map 430 or any other persistent storage. Then, the push/pull engine 350 issues the range-type
  RPCs to seed the data until CRI 540 is exhausted, in which case the engine 350 issues the range-type RPC again to fetch the next set of CRI 540. This procedure continues until seeding is complete.

In an embodiment, the in-memory cache CRI 540 is used when performing data seeding by the data I/O manager 330. As described herein. Persistently storing the CRI metadata is another option instead of storing the metadata in memory. Illustratively, the CRI 540 identifying the changed data region includes external repository specific information to identify the data in the external repository (e.g., an object name, an offset and a length (within the object) when using an object store for the external repository). In addition, there may be a qualifying field indicating whether the data is a zero.

In another embodiment, the CRI 540 fetched from LTSS 180 may be transformed and persisted on the cluster as any other immutable snapshot vdisk's metadata with a directional hint. Notably, CRI metadata may be absorbed within the vdisk maps (i.e, translating vdisk address space to physical disk locations) enables the UVM to issue reads/writes on to the live child vdisk despite the datasource backed vdisk's data not being locally present. The metadata for the datasource backed vdisk will indicate whether a read on a particular range could be served locally from previously taken snapshots (parent snapshot vdisks) or whether it is part of the changed data that is yet to be seeded from the external repository. In the latter case, the data shall be seeded on-demand from the external repository, to satisfy the UVM's read.

The procedure for fetching the CRI and storing it on the cluster is referred to as persistent metadata seeding and the procedure for pulling the data from the external repository 520 (via LTSS 180) to the on-premises cluster 510 is referred to as data seeding. Data typically fetched from the external repository through LTSS 180 may render LTSS a bottleneck for performance, e.g., by adding an additional hop in fetching data. However, LTSS 180 may store the data in the external repository 520 (object store) and provide the necessary information as, e.g., fast-path metadata, to identify (reference or locate using paths, uniform resource locators and the like) the physical location of the backing objects. In an embodiment, LTSS 180 may employ the CRT API 530 to also provide information for direct access to the underlying storage of the external repository, e.g., LTSS can provide the object name, offset and length information so that cluster 510 can directly reach the datasource disk 525 in the object store (external repository 520) rather than going through LTSS 180 for data. Such direct access is referred to as "fast-path" to the cloud.

The technique described herein is configured to perform grafting and incorporating information from the CRI 540 provided by the external repository 520 into the mapping metadata structures 400 to provide:

1. Improved background and foreground seeding performance using the CRI and to use data already available in the cluster in an existing vdisk chain via, e.g., the reference vdisk.
2. Existing optimization of copying mapping metadata structures in the vdisk chain to avoid traversing an entire vdisk chain and further facilitating severing of the vdisk chain, i.e., the process of removing older snapshots from the system.
3. Existing optimization of keeping a persistent cache of merged Mapping metadata structure view of the vdisk chain to improve read performance.
4. Improved re-replication by the replication manager as the metadata is available in a known format across the cluster.
5. Improved hydration/seeding of data by using fast-path information in the metadata to bring data directly from the underlying object storage used by LTSS seamlessly to the on-premises cluster.
6. Improved snapshot capabilities with need for local node storage, since snapshots of the UVM vdisks can be taken even though the data for them are not completely local as data from these snapshots may be hydrated from the cluster or external storage as well, even though the snapshots are incomplete in terms of local data availability. This can reduce the cost of retrieving data from the underlying object storage and its pay-per-use model.

The grafting and diff-based data seeding technique described herein reduces the amount of data transfer (and concomitant cost of pulling data) and, thus, enables faster data seeding/transfer since only the changed data is fetched from the external repository 520. LTSS 180 may utilize the CRI 540 to identify (1) one or more underlying objects (object names) of the object store (external repository) that stores the datasource disk 525, (2) the offset within the object at which to access the changed data region of the datasource disk 525 and (3) the length within the object of the changed data region. This CRI metadata is relayed (via metadata seeding) to the data I/O manager 330 of the cluster, which transforms the CRI into mapping metadata structures 400 for persistent storage in the distributed metadata store 340 of the cluster. Once metadata seeding is performed and the CRI 540 is persistently stored on the metadata store, the technique reduces the use of LTSS 180 because the changed regions needed to determine the data seeded from the external datasource disk 525 can be retrieved from mapping structures 400 in accordance with a "fast-path" feature of the technique to reduce use of, and hence load on, the LTSS. Hence, LTSS can be used minimally while the UVMs 210 continue to operate, and data may be fetched from the external repository 520 (object store). After metadata seeding is done, subsequent snapshots may be generated at the on-premises cluster 510 without fetching all of the data locally.

Once the CRI is persisted, the data I/O manager 330 can communicate directly with the object store, thereby reducing the need to use LTSS 180 to hydrate the datasource-backed vdisk. In an embodiment, LTSS 180 runs in the cloud to process and store snapshots of the application workloads on the object store as objects. By running on the cloud, LTSS 180 incurs costs to process, store and retrieve data from the object store. Once processing of persistent metadata seeding is complete, LTSS's use is reduced.

Advantageously, the technique utilizes grafting and diff-based data seeding, as well as CRI metadata seeding in a cloud environment as a "DR as a Service" offering that obviates aggressive pulling of changed data yet still allows instant recovery of an application workload. That is, the technique obviates initial fetching of data (up front) in order to power on and restore a UVM affected by the disaster, yet when requested by the UVM, read data may be pulled on-demand using CRI metadata stored in the persistent metadata store. The external datasource disk is "hooked" to the datasource-backed vdisk to enable on-demand paging (backfilling) of data as required, i.e., to enable instant recovery of the UVM and its application workload. The technique also incorporates CRI into persistent mapping structures to reduce or minimize use of the LTSS when retrieving changed data regions directly from external datasource vdisk via a fast-path feature.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or electronic memory) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
grafting a virtual disk (vdisk) onto a snapshot chain for a workload vdisk as a thinly provisioned child vdisk of a reference snapshot, wherein snapshots of the chain are replicated to an external repository and the workload vdisk is stored on a node executing a user virtual machine (UVM) using the workload vdisk;
retrieving differences between the reference snapshot and a datasource snapshot of the snapshot chain from the repository; and
hydrating the grafted vdisk based on the differences retrieved from the repository, wherein changed read data of the reference snapshot are pulled from the external repository and unchanged read data are served from the reference snapshot stored on the node.

2. The method of claim 1 wherein retrieving differences between the reference snapshot and datasource snapshot from the repository further comprises:
issuing an application programming interface (API) call to a long-term snapshot service (LTSS) to gather changes between the reference snapshot and datasource snapshot, wherein the LTSS is external to the node.

3. The method of claim 2, wherein issuing the API call to the LTSS further comprises issuing a changed region tracking API to list changed regions between the snapshots.

4. The method of claim 1, wherein retrieving differences between the reference snapshot and datasource snapshot from the repository further comprises caching metadata referencing locations in the repository that identify the differences.

5. The method of claim 4, wherein the metadata is accumulated into a map format within the node.

6. The method of claim 1, further comprising:
creating a clone of the grafted vdisk to receive input/output (I/O) requests from a failover or failback UVM.

7. The method of claim 6, wherein the grafted vdisk is hidden in the snapshot chain from a user.

8. The method of claim 1, wherein periodic snapshots of the snapshot chain resume after metadata hydration of the grafted vdisk completes.

9. The method of claim 1, wherein the differences are fetched via a long-term snapshot service external to the node.

10. The method of claim 1, wherein metadata locating the differences is cached within the node.

11. A non-transitory computer readable medium including program instructions for execution on a processor, the program instructions configured to:
graft a virtual disk (vdisk) onto a snapshot chain for a workload vdisk as a thinly provisioned child vdisk of a reference snapshot, wherein snapshots of the chain are replicated to an external repository and the workload vdisk is stored on a node executing a user virtual machine (UVM) using the workload vdisk;
retrieve differences between the reference snapshot and a datasource snapshot of the snapshot chain from the repository; and
hydrate the grafted vdisk based on the differences retrieved from the repository, wherein changed read data of the reference snapshot are pulled from the repository and unchanged read data are served from the reference snapshot stored on the node.

12. The non-transitory computer readable medium of claim 11 wherein the program instructions configured to retrieve differences between the reference snapshot and datasource snapshot from the repository are further configured to:
issue an application programming interface (API) call to a long-term snapshot service (LTSS) to gather changes between the reference snapshot and datasource snapshot, wherein the LTSS is external to the node.

13. The non-transitory computer readable medium of claim 12, wherein issuing the API call to the LTSS further comprises issuing a changed region tracking API to list changed regions between the snapshots.

14. The non-transitory computer readable medium of claim 11 wherein the program instructions configured to retrieve differences between the reference snapshot and datasource snapshot from the repository are further configured to:
issue an application programming interface (API) call to a long-term snapshot service (LTSS) to gather changes between the reference snapshot and datasource snapshot, wherein the LTSS is local to the node and includes an object store external to the node.

15. The non-transitory computer readable medium of claim 11 wherein the program instructions configured to retrieve differences between the reference snapshot and datasource snapshot from the repository are further configured to cache metadata referencing locations in the repository that identify the differences.

16. The non-transitory computer readable medium of claim 15, wherein the metadata is accumulated into a map format within the node.

17. The non-transitory computer readable medium of claim 11 wherein the program instructions are further configured to create a clone of the grafted vdisk to receive input/output (I/O) requests from a failover UVM.

18. The non-transitory computer readable medium of claim 17, wherein the grafted vdisk is hidden in the snapshot chain from a user.

19. The non-transitory computer readable medium of claim 11, wherein periodic snapshots of the snapshot chain resume after metadata hydration of the grafted vdisk completes.

20. The non-transitory computer readable medium of claim 11, wherein the differences are fetched via a long-term snapshot service external to the node.

21. An apparatus comprising:
a controller virtual machine (CVM) of a node of a failover environment, the node having a processor configured to execute program instructions to,
graft a virtual disk (vdisk) onto a snapshot chain for a workload vdisk as a thinly provisioned child vdisk of a reference snapshot, wherein snapshots of the chain are replicated to an external repository and the workload vdisk is stored on the node executing a user virtual machine (UVM) using the workload vdisk;
retrieve differences between the reference snapshot and a datasource snapshot of the snapshot chain from the repository; and
hydrate the grafted vdisk based on the differences retrieved from the repository, wherein changed read data of the reference snapshot are pulled from the repository and unchanged read data are served from the reference snapshot stored on the node.

22. The apparatus of claim 21 wherein the program instructions to retrieve differences between the reference snapshot and datasource snapshot from the repository further include program instructions to:

issue an application programming interface (API) call to a long-term snapshot service (LTSS) external to the node to gather changes between the reference snapshot and datasource snapshot.

23. The apparatus of claim 22, wherein the program instructions to issue the API call to the LTSS further includes program instructions to issue a changed region tracking API to list changed regions between the snapshots.

24. The apparatus of claim 21 wherein the program instructions to retrieve differences between the reference snapshot and datasource snapshot from the repository further include program instructions to cache metadata referencing locations in the repository that identify the differences.

25. The apparatus of claim 24, wherein the metadata is accumulated into a map format within the node.

26. The apparatus of claim 21 wherein the program instructions further include program instructions to create a clone of the grafted vdisk to receive input/output (I/O) requests from a failover UVM.

27. The apparatus of claim 26, wherein the grafted vdisk is hidden in the snapshot chain from a user.

28. The apparatus of claim 21, wherein periodic snapshots of the snapshot chain resume after hydration of the grafted vdisk completes.

29. The apparatus of claim 21, wherein the differences are fetched via a long-term snapshot service external to the node.

* * * * *